United States Patent
Nakano et al.

(10) Patent No.: US 8,878,477 B2
(45) Date of Patent: Nov. 4, 2014

(54) ELECTRIC MOTOR DRIVING APPARATUS HAVING FAILURE DETECTION CIRCUIT, AND FAILURE DETECTION METHOD FOR THE ELECTRIC MOTOR DRIVING APPARATUS HAVING FAILURE DETECTION CIRCUIT

(71) Applicants: Kosuke Nakano, Chiyoda-ku (JP); Tetsuya Kojima, Chiyoda-ku (JP); Satoshi Azuma, Chiyoda-ku (JP); Isao Kezobo, Chiyoda-ku (JP); Ryuichi Takiguchi, Chiyoda-ku (JP)

(72) Inventors: Kosuke Nakano, Chiyoda-ku (JP); Tetsuya Kojima, Chiyoda-ku (JP); Satoshi Azuma, Chiyoda-ku (JP); Isao Kezobo, Chiyoda-ku (JP); Ryuichi Takiguchi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 42 days.

(21) Appl. No.: 13/738,213

(22) Filed: Jan. 10, 2013

(65) Prior Publication Data
US 2013/0257332 A1 Oct. 3, 2013

(30) Foreign Application Priority Data
Mar. 29, 2012 (JP) ................. 2012-076389

(51) Int. Cl.
*H02P 1/00* (2006.01)
*H02P 27/08* (2006.01)
*H02P 5/00* (2006.01)

(52) U.S. Cl.
USPC .. 318/490; 318/430; 318/400.11; 318/400.17

(58) Field of Classification Search
USPC ............... 318/430, 432, 490, 801, 400.11, 318/400.17; 180/443
See application file for complete search history.

(56) References Cited

U.S. PATENT DOCUMENTS

| 7,855,527 | B2 * | 12/2010 | Goto et al. ................. 318/801 |
| 2001/0027894 | A1 * | 10/2001 | Noro et al. ................. 180/443 |
| 2006/0001392 | A1 * | 1/2006 | Ajima et al. ............... 318/432 |
| 2009/0263260 | A1 * | 10/2009 | Goto et al. ............. 417/410.1 |

FOREIGN PATENT DOCUMENTS

JP 2010-136581 A 6/2010

* cited by examiner

Primary Examiner — Paul Ip
(74) Attorney, Agent, or Firm — Sughrue Mion, PLLC (57) ABSTRACT

An electric motor driving apparatus having a failure detection circuit includes: a bridge circuit driving an electric motor; a PWM control circuit generating voltage instruction for driving the electric motor; a PWM signal generation circuit generating a PWM signal; a DC current detection circuit detecting DC current of the bridge circuit; a phase current calculation circuit calculating output phase current of the bridge circuit, based on the DC current and PWM signal; and a failure detection circuit detecting failure of the DC current detection circuit. The failure detection circuit determines failure of the DC current detection circuit from the DC current detected values in a zero voltage period in which the high-potential-side arms of the bridge circuit are all ON and in a zero voltage period in which the low-potential-side arms are all ON.

17 Claims, 7 Drawing Sheets

| VOLTAGE VECTOR | SWITCHING STATE | | | CURRENT THAT CAN BE DETECTED |
|---|---|---|---|---|
| | U PHASE | V PHASE | W PHASE | |
| V10 | 0 | 0 | 0 | — |
| V11 | 0 | 0 | 1 | iw1 |
| V12 | 0 | 1 | 0 | iv1 |
| V13 | 0 | 1 | 1 | -iu1 |
| V14 | 1 | 0 | 0 | iu1 |
| V15 | 1 | 0 | 1 | -iv1 |
| V16 | 1 | 1 | 0 | -iw1 |
| V17 | 1 | 1 | 1 | — |

|  | UPPER ARMS ARE ALL ON | |
|---|---|---|
|  | idc = 0 | idc ≠ 0 |
| LOWER ARMS ARE ALL ON — idc = 0 | ALL NORMAL | SHORT-CIRCUIT FAILURE OF LOWER ARM |
| LOWER ARMS ARE ALL ON — idc ≠ 0 | SHORT-CIRCUIT FAILURE OF UPPER ARM | FAILURE OF DC CURRENT DETECTION CIRCUIT |

ELECTRIC MOTOR DRIVING APPARATUS HAVING FAILURE DETECTION CIRCUIT, AND FAILURE DETECTION METHOD FOR THE ELECTRIC MOTOR DRIVING APPARATUS HAVING FAILURE DETECTION CIRCUIT

BACKGROUND OF THE INVENTION

1. Field of the Invention

The present invention relates to an electric motor driving apparatus, having a failure detection circuit, which drives a three-phase-winding electric motor or a multiplex-winding electric motor.

2. Description of the Background Art

In electric motor control, if a current sensor for detecting DC current on a DC power supply side or output phase current has failed, an electric motor cannot be controlled. Therefore, an electric motor driving apparatus needs to determine whether or not the current sensor has failed.

As a method for detecting failure of the current sensor, a method is disclosed in which DC current is detected by a current sensor connected to a DC power supply side, output phase current is calculated based on the detection, and failure of the current sensor is detected in a zero voltage vector period (for example, Patent Document 1).

Patent Document 1: Japanese Laid-Open Patent Publication No. 2010-136581 (paragraphs [0022] and [0026], and FIG. 1)

In the invention disclosed in Patent Document 1, since failure of the current sensor is determined only when the rotation rate of the electric motor is zero, there is a problem that failure of the current sensor cannot be detected when the rotation rate of the electric motor is other than zero, that is, during normal operation.

SUMMARY OF THE INVENTION

The present invention has been made to solve the above problem, and an object of the present invention is to provide an electric motor driving apparatus, having a failure detection circuit, that is capable of detecting failure of a DC current detection circuit that includes a current sensor even during normal operation regardless of the rotation rate of an electric motor, and a failure detection method for the electric motor driving apparatus having a failure detection circuit.

An electric motor driving apparatus having a failure detection circuit according to the first invention includes: a bridge circuit which drives an electric motor and is composed of high-potential-side arms and low-potential-side arms; a PWM (Pulse Width Modulation) control circuit which generates a voltage instruction for driving the electric motor; a PWM signal generation circuit which generates a PWM signal from the voltage instruction; a DC current detection circuit which detects DC current on a DC side of the bridge circuit; a phase current calculation circuit which calculates output phase current of the bridge circuit, based on the DC current and the PWM signal; and a failure detection circuit which detects failure of the DC current detection circuit. The failure detection circuit determines failure of the DC current detection circuit from the DC current detected values in a zero voltage vector period in which the high-potential-side arms of the bridge circuit are all ON and in a zero voltage vector period in which the low-potential-side arms of the bridge circuit are all ON.

An electric motor driving apparatus having a failure detection circuit according to the second invention includes: a plurality of bridge circuits which drive a multiplex-winding electric motor and are each composed of high-potential-side arms and low-potential-side arms; a PWM control circuit which generates a voltage instruction for driving the multiplex-winding electric motor; a PWM signal generation circuit which generates a PWM signal from the voltage instruction; a plurality of DC current detection circuits which detect DC currents on DC sides of the plurality of bridge circuits; a phase current calculation circuit which calculates output phase currents of the plurality of bridge circuits, based on the DC currents and the PWM signal; and a failure detection circuit which detects failure of the plurality of DC current detection circuits. The failure detection circuit determines failure of the plurality of DC current detection circuits from the DC current detected values in a zero voltage vector period in which the high-potential-side arms of the corresponding bridge circuit are all ON and in a zero voltage vector period in which the low-potential-side arms of the corresponding bridge circuit are all ON.

A failure detection method for an electric motor driving apparatus having a failure detection circuit according to the present invention, the electric motor driving apparatus having: a bridge circuit which drives an electric motor and is composed of high-potential-side arms and low-potential-side arms; a PWM control circuit which generates a voltage instruction for driving the electric motor; a PWM signal generation circuit which generates a PWM signal from the voltage instruction; a DC current detection circuit which detects DC current idc on a DC side of the bridge circuit; a phase current calculation circuit which calculates output phase current of the bridge circuit, based on the DC current idc and the PWM signal; and a failure detection circuit which detects failure of the DC current detection circuit, includes: processing of obtaining the DC current idc in a zero voltage vector period in which the high-potential-side arms are all ON; processing of obtaining the DC current idc in a zero voltage vector period in which the low-potential-side arms are all ON; and processing of determining that the DC current detection circuit has failed, if idc≠0 is satisfied in the zero voltage vector period in which the high-potential-side arms are all ON and idc≠0 is satisfied in the zero voltage vector period in which the low-potential-side arms are all ON.

Since the electric motor driving apparatus having the failure detection circuit according to the first invention is configured as described above, it is possible to detect failure of the DC current detection circuit that includes a current sensor even during normal operation, regardless of the rotation rate of the electric motor.

Since the electric motor driving apparatus having the failure detection circuit according to the second invention is configured as described above, it is possible to detect failure of each DC current detection circuit that includes a current sensor even during normal operation, regardless of the rotation rate of the multiplex-winding electric motor.

Since the failure detection method for the electric motor driving apparatus having a failure detection circuit according to the present invention is composed of the above processings, it is possible to detect failure of the DC current detection circuit that includes a current sensor even during normal operation, regardless of the rotation rate of the electric motor.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

The first embodiment relates to an electric motor driving apparatus having a failure detection circuit, the electric motor driving apparatus including: a bridge circuit which drives a three-phase winding electric motor; a DC power supply; a PWM control circuit; a PWM signal generation circuit; a DC current detection circuit; a phase current calculation circuit; and a failure detection circuit, and to a failure detection method for the electric motor driving apparatus having a failure detection circuit. The failure detection circuit determines failure of the DC current detection circuit from DC current detected values in a zero voltage vector period in which high-potential-side arms of the bridge circuit are all ON and in a zero voltage vector period in which low-potential-side arms of the bridge circuit are all ON.

Hereinafter, the configuration and operation of the first embodiment of the present invention will be described based on FIG. 1 which is a system configuration diagram of the electric motor driving apparatus having the failure detection circuit, FIG. 2 which is a general explanation diagram of PWM signal generation, FIG. 3 which is an operation explanation diagram of PWM control, FIG. 4 which is an explanation diagram of PWM signal generation, FIG. 5 which is an operation explanation diagram of the failure detection circuit, and FIG. 6 which is a failure detection flowchart.

Figure 1:
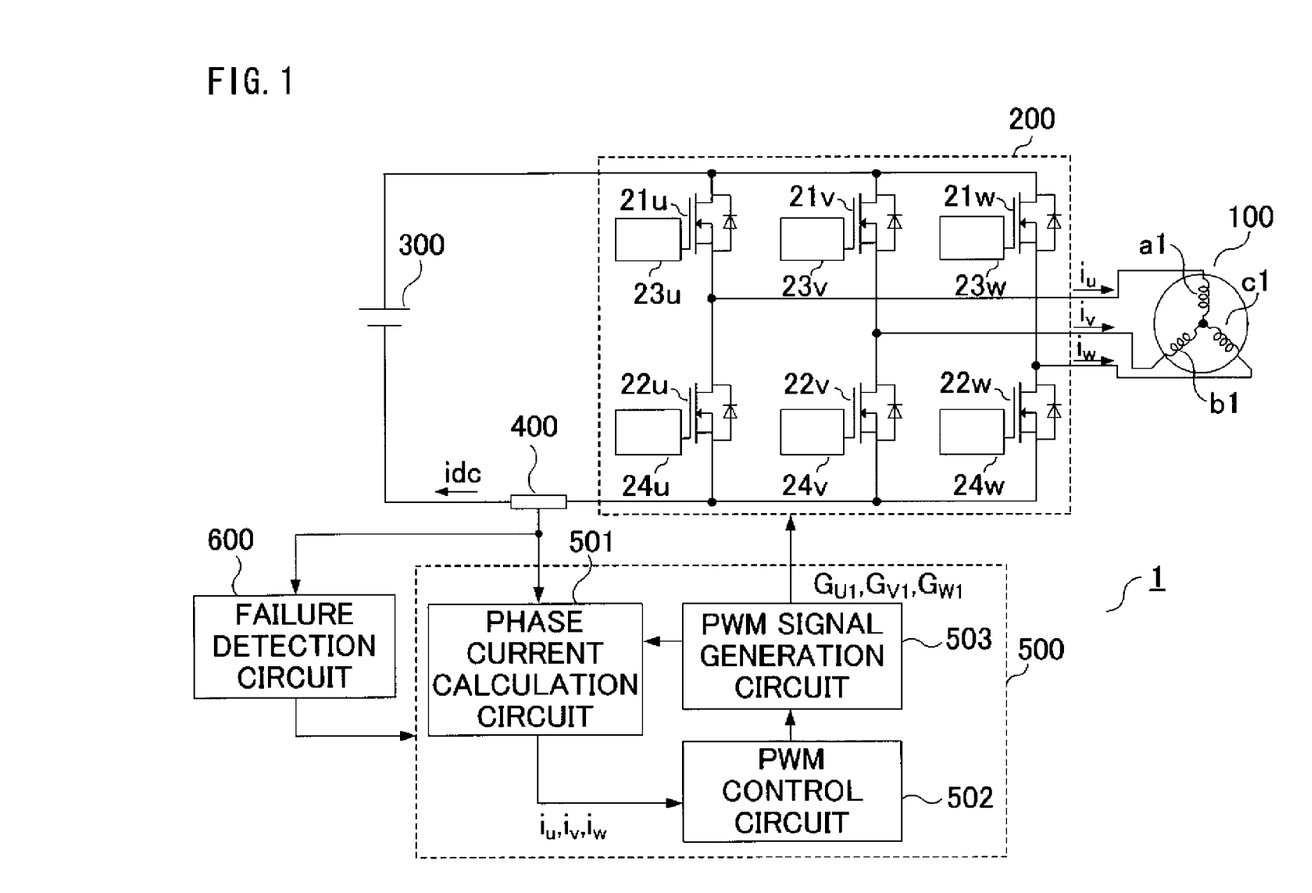
FIG. 1 is a system configuration diagram according to an electric motor driving apparatus having a failure detection circuit of the first embodiment of the present invention.

FIG. 1 shows a system configuration that includes an electric motor driving apparatus 1 having a failure detection circuit, and a three-phase winding electric motor (hereinafter, referred to as an electric motor) 100 as a driving target.

In FIG. 1, the electric motor driving apparatus 1 having the failure detection circuit is composed of: a bridge circuit 200 which drives the electric motor 100; a DC power supply 300; a DC current detection circuit 400; a control section 500; and a failure detection circuit 600.

The control section 500 is composed of a phase current calculation circuit 501, a PWM control circuit 502, and a PWM signal generation circuit 503.

The DC power supply 300 is a DC power supply such as a battery, and supplies DC power to the bridge circuit 200.

The bridge circuit 200 has: high-potential-side arms (hereinafter, referred to as upper arms) 21u, 21v, and 21w, respectively provided for U, V, and W phases, which perform switching operation between the positive end side of the DC power supply 300 and the respective phase lines; and low-potential-side arms (hereinafter, referred to as lower arms) 22u, 22v, and 22w, respectively provided for U, V, and W phases, which perform switching operation between the negative end side of the DC power supply 300 and the respective phase lines. Further, the bridge circuit 200 has high-potential-side driving circuits 23u, 23v, and 23w corresponding to the respective upper arms, and low-potential-side driving circuits 24u, 24v, and 24w corresponding to the respective lower arms.

Hereinafter, when the high-potential-side arms 21u, 21v, and 21w are collectively referred to, they are referred to as upper arms 21, and when the low-potential-side arms 22u, 22v, and 22w are collectively referred to, they are referred to as lower arms 22. In addition, when the high-potential-side driving circuits 23u, 23v, and 23w are collectively referred to, they are referred to as upper arm driving circuits 23, and when the low-potential-side driving circuits 24u, 24v, and 24w are collectively referred to, they are referred to as lower arm driving circuits 24.

Further, the circuit configuration of the bridge circuit 200 will be described.

The high potential sides of the upper arms 21 of the bridge circuit 200 are connected to each other, and the connection end is connected to the positive end side of the DC power supply 300. The low potential sides of the lower arms 22 are connected to each other, and the connection end is connected to one end of the DC current detection circuit 400, and the other end thereof is connected to the negative end side of the DC power supply 300.

The connection end between the source electrode of the upper arm 21u and the drain electrode of the lower arm 22u is connected to a winding al of the three-phase winding electric motor 100. The connection end between the source electrode of the upper arm 21v and the drain electrode of the lower arm 22v is connected to a winding b1 of the three-phase winding electric motor 100. The connection end between the source electrode of the upper arm 21w and the drain electrode of the lower arm 22w is connected to a winding cl of the three-phase winding electric motor 100.

Diodes (having no reference numerals) connected in parallel to the upper arms 21 and the lower arms 22 represent parasitic diodes of MOSFETs (Metal-Oxide-Semiconductor Field-Effect Transistor).

FIG. 1 shows an example using MOSFETs as switching devices of the upper arms 21 and the lower arms 22 of the bridge circuit 200. However, the switching devices are not limited to MOSFETs. For example, IBGTs (Insulated Gate Bipolar Transistor) may be used.

Next, the configuration and operation of the DC current detection circuit 400 will be described.

The DC current detection circuit 400 is composed of a current sensor such as a shunt resistor or a DC-CT (Direct Current-Current Transformer), for example. The DC current detection circuit 400 detects DC current of the DC power supply 300, that is, DC current idc on the DC side of the bridge circuit 200, and outputs the detected value to the control section 500 and the failure detection circuit 600.

Next, the operation of the control section 500 will be described based on FIGS. 2 and 3.

It is noted that in the first embodiment, a triangle wave is used as a carrier signal. Three-phase modulation using triangle wave comparison will be described below.

Figure 2:
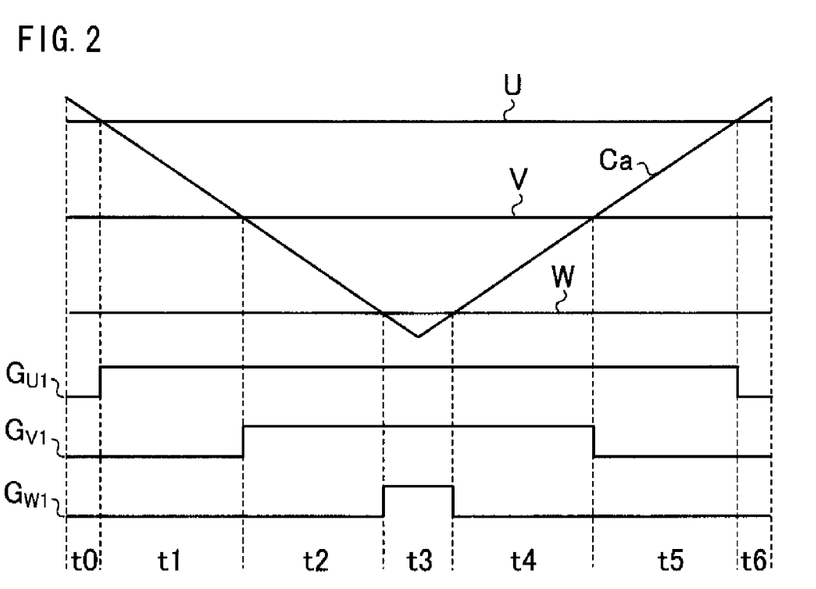
FIG. 2 is a general explanation diagram of PWM signal generation according to the electric motor driving apparatus having the failure detection circuit of the first embodiment of the present invention.

FIG. 2 shows a switching pattern outputted from the PWM control circuit 502, in three-phase modulation using triangle wave comparison, in a period in which voltage instructions for U, V, and W phases of the bridge circuit satisfy U>V>W.

In FIG. 2, U, V, and W represent voltage instructions for U, V, and W phases of the bridge circuit, and generally, have AC waveforms whose phases are shifted from each other by 120 [deg]. Since the frequency of a carrier signal is sufficiently high relative to the frequency of the three-phase output voltage, U, V, and W are represented as constant values (straight lines).

Gu1, Gv1, and Gw1 represent PWM signals for U, V, and W phases, and Ca represents a carrier signal.

In FIG. 2, when the PWM signal Gu1 is at H-level, the upper arm 21u is ON and the lower arm 22u is OFF, and when the PWM signal Gu1 is at L-level, the upper arm 21u is OFF and the lower arm 22u is ON. Actually, dead time is provided so as not to short-circuit the upper and lower arms, but is omitted for simplifying the description. The same holds true for Gv1 and Gw1.

Figure 3:
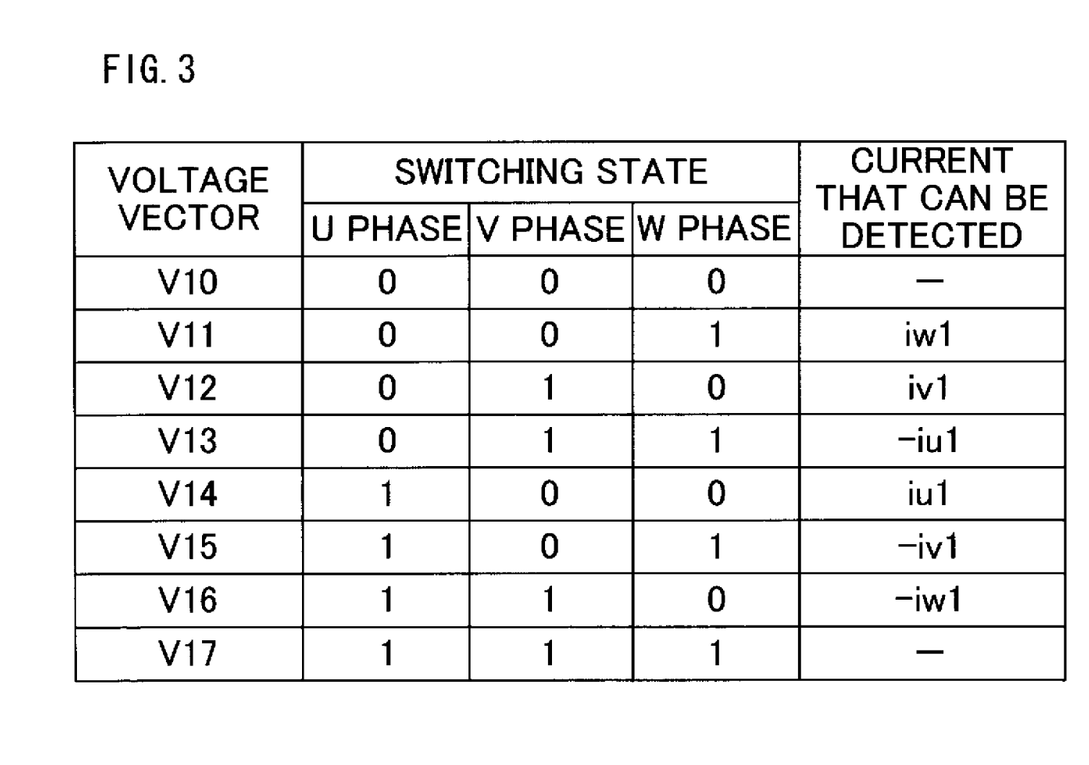
FIG. 3 is an operation explanation diagram of PWM control according to the electric motor driving apparatus having the failure detection circuit of the first embodiment of the present invention.

FIG. 3 is an operation explanation diagram of PWM control, and specifically, is a table showing the relationship among a voltage vector of the bridge circuit 200, the switching state of each switching device, and a current value that can be detected.

Here, a switching state "0" indicates that the upper arm is OFF and the lower arm is ON, and a switching state "1" indicates that the upper arm is ON and the lower arm is OFF.

The phase current calculation circuit 501 calculates output phase currents iu, iv, and iw, based on the DC current idc, and the PWM signals Gu1, Gv1, and Gw1 generated by the PWM signal generation circuit 503 described later and outputted to the bridge circuit 200.

In period t0 in FIG. 2, the voltage vector is V10 (0, 0, 0), and current does not flow on the DC power supply 300 side.

In period t1, the voltage vector is V14 (1, 0, 0), and idc=iu is satisfied. In period t2, the voltage vector is V16 (1, 1, 0), and idc=−iw is satisfied.

At this point of time, currents for two phases, i.e., U-phase and W-phase can be detected. Since the sum of three-phase currents is zero, the V-phase current iv can be estimated as iv=−iw−iu.

Through repetition of the above calculation, the output phase current can be reproduced by detecting the DC current on the DC power supply 300 side.

Next, the operations of the PWM control circuit 502 and the PWM signal generation circuit 503 will be described.

The PWM control circuit 502 generates a voltage instruction for controlling the electric motor 100 to be in a desired state, based on the current value estimated by the phase current calculation circuit 501, by using a frequency instruction, a torque instruction, or the like (not shown) for the electric motor 100.

The PWM signal generation circuit 503 generates a PWM signal, based on the voltage instruction generated by the PWM control circuit 502.

Next, the operation of the failure detection circuit 600 will be described based on FIGS. 4 and 5.

Figure 4:
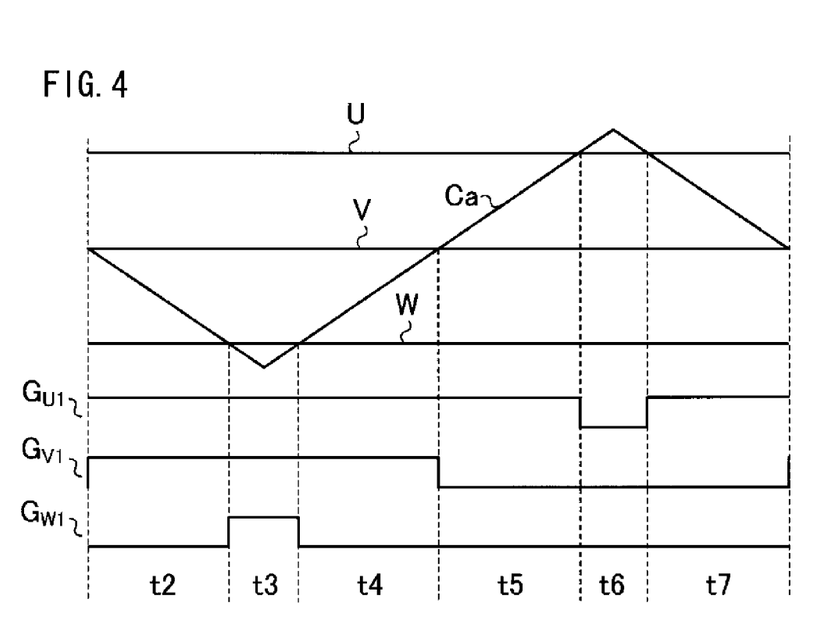
FIG. 4 is an explanation diagram of PWM signal generation according to the electric motor driving apparatus having the failure detection circuit of the first embodiment of the present invention.

FIG. 4 is a diagram for explaining PWM signal generation relevant to the operation of the failure detection circuit 600. Similarly to FIG. 2, triangle wave comparison is used for generating a switching pulse. FIG. 4 focuses on periods t3 and t6 which are used for failure detection, and periods t2 to t5 are the same as those in FIG. 2.

An object of the invention of the first embodiment is to detect failure of the DC current detection circuit 400. However, in the process of detecting failure of the DC current detection circuit 400, short-circuit failure of the upper arms 21 and short-circuit failure of the lower arms 22 of the bridge circuit 200 can also be detected. Therefore, these failures will be described together.

Hereinafter, the case where the DC current detection circuit 400, the upper arms 21, and the lower arms 22 are all normal, the case where the DC current detection circuit 400 has failed, the case where the upper arm 21 has failed due to short-circuit, and the case where the lower arm 22 has failed due to short-circuit, will be described.

First, the case where the DC current detection circuit 400, the upper arms 21, and the lower arms 22 are all normal will be described.

In period t3, the upper arms 21u, 21v, and 21w are ON. If the lower arms 22u, 22v, and 22w are all normal and OFF, current does not flow on the DC power supply 300 side. Therefore, zero is outputted from the DC current detection circuit 400.

In period t6, the lower arms 22u, 22v, and 22w are ON. If the upper arms 21u, 21v, and 21w are all normal and OFF, current does not flow on the DC power supply 300 side. Therefore, zero is outputted from the DC current detection circuit 400.

Next, the case where the lower arm 22 has failed due to short-circuit (the DC current detection circuit 400 and the upper arms 21 are normal) will be described.

In period t3, the upper arms 21u, 21v, and 21w are ON. If any of the lower arms 22u, 22v, and 22w has failed due to short-circuit, short-circuit current flows on the DC power supply 300 side. Therefore, a value other than zero (idc≠0) is outputted from the DC current detection circuit 400.

In period t6, the lower arms 22u, 22v, and 22w are ON. Even if any of the lower arms 22u, 22v, and 22w has failed due to short-circuit, short-circuit current does not flow on the DC power supply 300 side as long as the upper arms 21u, 21v, and 21w are all normal and OFF. Therefore, zero (idc=0) is outputted from the DC current detection circuit 400.

Next, the case where the upper arm 21 has failed due to short-circuit (the DC current detection circuit 400 and the lower arms 22 are normal) will be described.

In period t3, the upper arms 21u, 21v, and 21w are ON. Even if any of the upper arms 21u, 21v, and 21w has failed due to short-circuit, short-circuit current does not flow on the DC power supply 300 side as long as the lower arms 22u, 22v, and 22w are all normal and OFF. Therefore, zero (idc=0) is outputted from the DC current detection circuit 400.

In period t6, the lower arms 22u, 22v, and 22w are ON. If any of the upper arms 21u, 21v, and 21w has failed due to short-circuit, short-circuit current flows on the DC power supply 300 side. Therefore, a value other than zero (idc≠0) is outputted from the DC current detection circuit 400.

Next, the case where the DC current detection circuit 400 has failed (the upper arms 21 and the lower arms 22 are normal) will be described.

In period t3, the upper arms 21u, 21v, and 21w are ON. If the lower arms 22u, 22v, and 22w are all normal and OFF, normally, zero (idc=0) should be outputted from the DC current detection circuit 400. However, in the case where the DC current detection circuit 400 has failed, a value other than zero (idc≠0) is outputted.

Also in period t6, although, normally, zero (idc=0) should be outputted from the DC current detection circuit 400, a value other than zero (idc≠0) is outputted.

Figure 5:
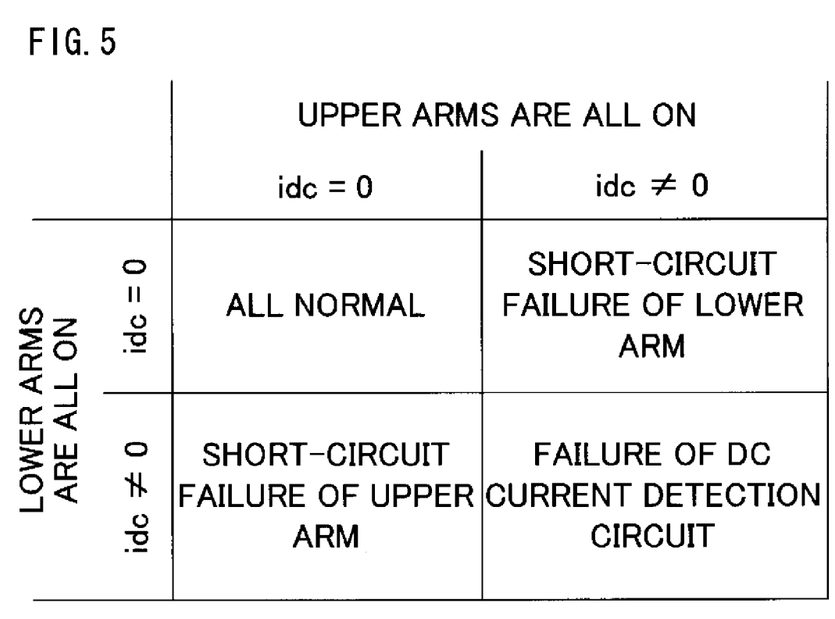
FIG. 5 is an operation explanation diagram of a failure detection circuit according to the electric motor driving apparatus having the failure detection circuit of the first embodiment of the present invention.
Figure 6:
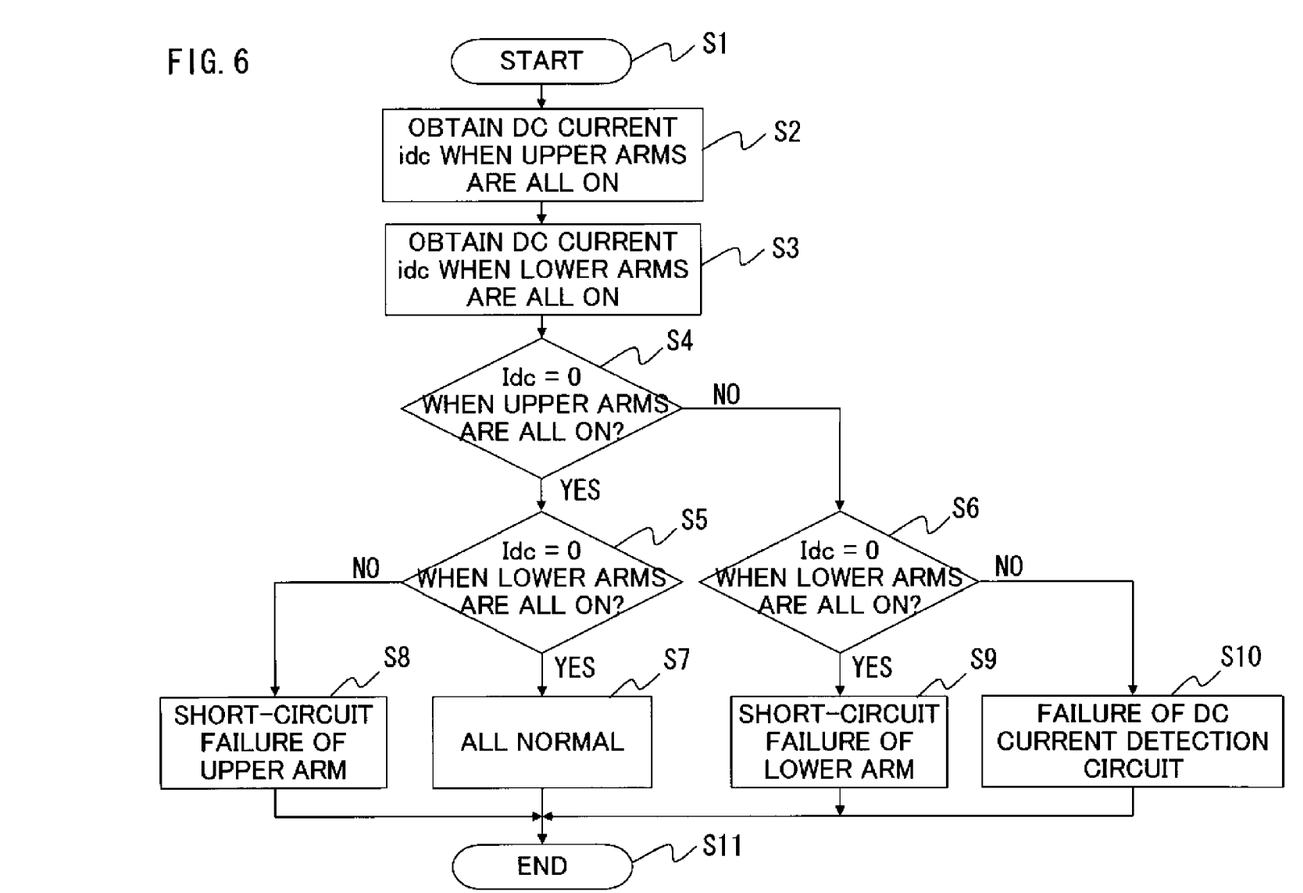
FIG. 6 is a failure detection flowchart according to the electric motor driving apparatus having the failure detection circuit of the first embodiment of the present invention.

The above-described operation of the failure detection circuit 600 can be summarized as a determination table shown in FIG. 5 which is an operation explanation diagram of the failure detection circuit. The determination table shown in FIG. 5 can be used for specifying failure of the DC current detection circuit 400, short-circuit failure of the upper arms 21, and short-circuit failure of the lower arms 22.

In the case where idc=0 is satisfied in a zero voltage vector period in which the upper arms 21 are all ON and idc=0 is satisfied in a zero voltage vector period in which the lower arms 22 are all ON, it is determined that the DC current detection circuit 400, the upper arms 21, and the lower arms 22 are normally operating.

In the case where idc≠0 is satisfied in a zero voltage vector period in which the upper arms 21 are all ON and idc=0 is satisfied in a zero voltage vector period in which the lower arms 22 are all ON, it is determined that any of the lower arms 22 has failed due to short-circuit.

In the case where idc=0 is satisfied in a zero voltage vector period in which the upper arms 21 are all ON and idc≠0 is satisfied in a zero voltage vector period in which the lower arms 22 are all ON, it is determined that any of the upper arms 21 has failed due to short-circuit.

In the case where idc≠0 is satisfied in a zero voltage vector period in which the upper arms 21 are all ON and idc≠0 is satisfied in a zero voltage vector period in which the lower arms 22 are all ON, it is determined that the DC current detection circuit 400 has failed.

The configuration and operation of the electric motor driving apparatus 1 having the failure detection circuit according to the first embodiment has been described above. Next, the failure detection method using the electric motor driving apparatus 1 having the failure detection circuit will be described based on the flowchart shown in FIG. 6.

A failure detection process is started (step S1), and then in step S2, the DC current idc in period t3 in FIG. 4, that is, the DC current idc in a zero voltage vector period in which the upper arms 21 are all ON, is obtained.

Next, in step S3, the DC current idc in period t6 in FIG. 4, that is, the DC current idc in a zero voltage vector period in which the lower arms 22 are all ON, is obtained.

Hereinafter, in step S4 and subsequent steps, failure of the DC current detection circuit 400, short-circuit failure of the upper arms 21, and short-circuit failure of the lower arms 22 are determined based on the values of the output current idc obtained in steps S2 and S3.

First, in step S4, whether or not the DC current idc in a zero voltage vector period in which the upper arms 21 are all ON is zero, is determined. If the determination result of step S4 is YES, the process proceeds to step S5, and if the determination result is NO, the process proceeds to step S6.

In step S5, whether or not the DC current idc in a zero voltage vector period in which the lower arms 22 are all ON is zero, is determined. If the determination result of step S5 is YES, the process proceeds to step S7 to determine that the DC current detection circuit 400, the upper arms 21, and the lower arms 22 are all normally operating, and then the process is finished in step S11.

If the determination result of step S5 is NO, the process proceeds to step S8 to determine that the upper arm 21 has failed due to short-circuit, and then the process is finished in step S11.

In step S6, whether or not the DC current idc in a zero voltage vector period in which the lower arms 22 are all ON is zero, is determined. If the determination result of step S6 is YES, the process proceeds to step S9 to determine that the lower arm 22 has failed due to short-circuit, and then the process is finished in step S11.

If the determination result of step S6 is NO, the process proceeds to step S10 to determine that the DC current detection circuit 400 has failed, and then the process is finished in step S11.

As described above, the electric motor driving apparatus having the failure detection circuit according to the first embodiment has: the bridge circuit which drives the three-phase winding electric motor; the DC power supply; the PWM control circuit; the PWM signal generation circuit; the DC current detection circuit; the phase current calculation circuit; and the failure detection circuit, and the failure detection circuit determines failure of the DC current detection circuit from the DC current detected values in a zero voltage vector period in which the high-potential-side arms of the bridge circuit are all ON and in a zero voltage vector period in which the low-potential-side arms of the bridge circuit are all ON. Therefore, the electric motor driving apparatus having the failure detection circuit can detect failure of the DC current detection circuit that includes a current sensor even during normal operation, regardless of the rotation rate of the electric motor.

Further, the electric motor driving apparatus having the failure detection circuit according to the first embodiment can also detect short-circuit failure of the upper arms and the lower arms of the bridge circuit which drives the three-phase winding electric motor, together with failure of the DC current detection circuit.

In addition, as described above, the failure detection method for the electric motor driving apparatus having a failure detection circuit according to the first embodiment is composed of: processing of obtaining the DC current idc in a zero voltage vector period in which the high-potential-side arms are all ON; processing of obtaining the DC current idc in a zero voltage vector period in which the low-potential-side arms are all ON; and processing of determining that the DC current detection circuit has failed if idc≠0 is satisfied in a zero voltage vector period in which the high-potential-side arms are all ON and idc≠0 is satisfied in a zero voltage vector period in which the low-potential-side arms are all ON. Therefore, the failure detection method for the electric motor driving apparatus having a failure detection circuit can detect failure of the DC current detection circuit that includes a current sensor even during normal operation, regardless of the rotation rate of the electric motor.

Further, the failure detection method for the electric motor driving apparatus having a failure detection circuit according to the first embodiment can also detect short-circuit failure of the upper arms and the lower arms of the bridge circuit, together with failure of the DC current detection circuit.

Second Embodiment

An electric motor driving apparatus having a failure detection circuit according to the second embodiment corresponds to the case where the invention described in the first embodiment is applied to a multiplex-winding electric motor.

The second embodiment relates to an electric motor driving apparatus having a failure detection circuit, the electric motor driving apparatus including: a plurality of bridge circuits which drive a multiplex-winding electric motor; a DC power supply; a PWM control circuit; a PWM signal generation circuit; a plurality of DC current detection circuits; phase current calculation circuit; and a failure detection circuit. The failure detection circuit determines failure of each DC current detection circuit from the DC current detected values in a zero voltage vector period in which high-potential-side arms of the corresponding bridge circuit are all ON and in a zero voltage vector period in which low-potential-side arms of the corresponding bridge circuit are all ON.

Hereinafter, the configuration and operation of the second embodiment of the present invention will be described based on FIG. 7 which is a system configuration diagram according to an electric motor driving apparatus 2 having a failure detection circuit.

Figure 7:
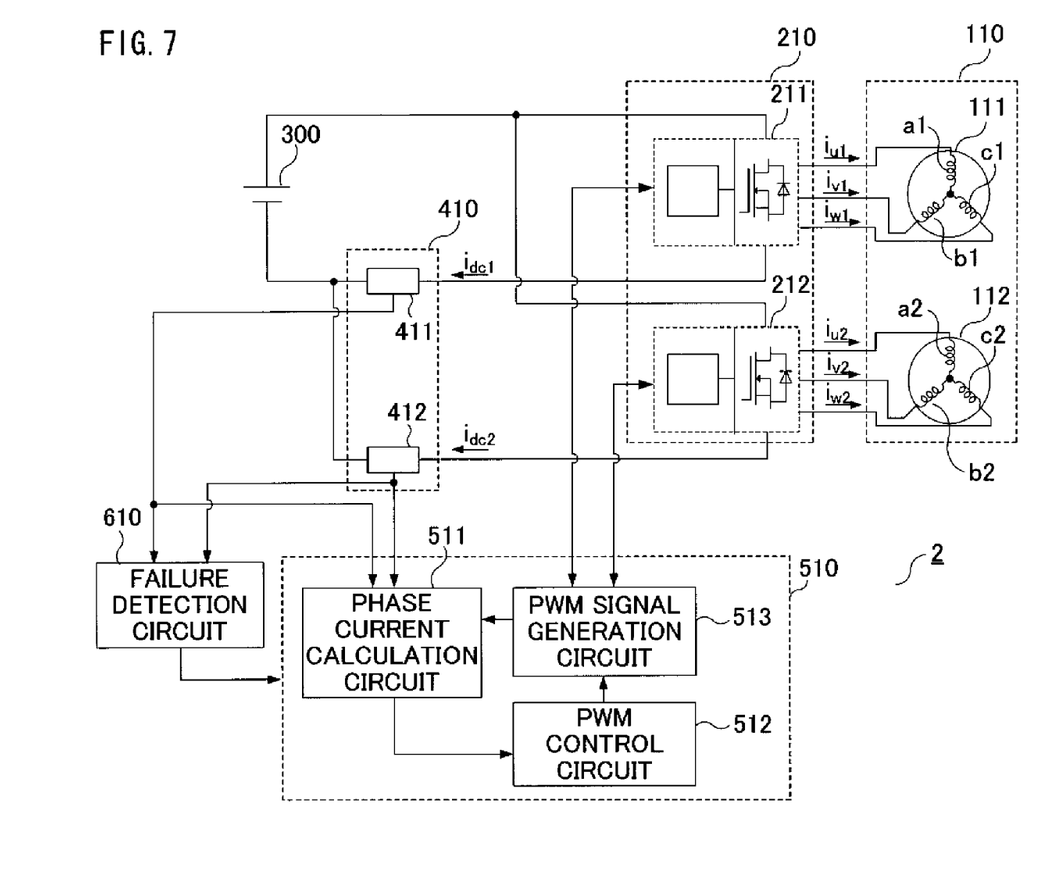
FIG. 7 is a system configuration diagram according to an electric motor driving apparatus having a failure detection circuit of the second embodiment of the present invention.

In FIG. 7, the components that are the same as or correspond to those in FIG. 1 are denoted by the same reference numerals.

The difference between the electric motor driving apparatus 2 having the failure detection circuit according to the second embodiment and the electric motor driving apparatus 1 having the failure detection circuit according to the first embodiment is that, along with the change of the winding electric motor to multiplex-winding type, two bridge circuits and two DC current detection circuits are provided. Since the configuration and operation of each component are the same as those of the first embodiment, the different part will be mainly described.

FIG. 7 shows a system configuration that includes the electric motor driving apparatus 2 having the failure detection circuit, and a multiplex-winding electric motor 110 as a driving target.

In FIG. 7, the electric motor driving apparatus 2 having the failure detection circuit is composed of: a bridge circuit 210 which drives the multiplex-winding electric motor 110; a DC power supply 300; a DC current detection circuit 410; a control section 510; and a failure detection circuit 610.

The control section 510 is composed of a phase current calculation circuit 511, a PWM control circuit 512, and a PWM signal generation circuit 513.

The multiplex-winding electric motor 110 is a six-phase electric motor having a first three-phase winding 111 and a second three-phase winding 112, their neutral points being independent from each other.

The bridge circuit 210 is composed of a first bridge circuit 211 and a second bridge circuit 212, and converts DC power supplied from the DC power supply 300 to AC power, to drive the multiplex-winding electric motor 110.

The DC power supply 300 is a DC power supply such as a battery, and supplies DC power to the bridge circuit 210.

The DC current detection circuit 410 is composed of a first DC current detection circuit 411 and a second DC current detection circuit 412. The first DC current detection circuit 411 is connected between the negative end side of the DC power supply 300 and the negative end side of the first bridge circuit 211, and detects DC current $idc_1$ on the DC current side of the first bridge circuit 211. The second DC current detection circuit 412 is connected between the negative end side of the DC power supply 300 and the negative end side of the second bridge circuit 212, and detects DC current $idc_2$ on the DC current side of the second bridge circuit 212.

The operations of the phase current calculation circuit 511, the PWM control circuit 512, and the PWM signal generation circuit 513 of the control section 510 are the same as those of the phase current calculation circuit 501, the PWM control circuit 502, and the PWM signal generation circuit 503 of the first embodiment. Therefore, the description thereof is omitted.

Detection targets of the failure detection circuit 610 are the DC current detection circuit 410 (the first DC current detection circuit 411 and the second DC current detection circuit 412) and the bridge circuit 210 (the first bridge circuit 211 and the second bridge circuit 212), and their operations are the same as in the first embodiment. Therefore, the description thereof is omitted.

The failure detection circuit 610 detects failure of the first DC current detection circuit 411 and the first bridge circuit 211, and detects failure of the second DC current detection circuit 412 and the second bridge circuit 212.

The timing for the failure detection circuit 610 to detect failure of the DC current detection circuit 410 may be the same or different between both DC current detection circuits, that is, the first DC current detection circuit 411 and the second DC current detection circuit 412.

The timing for the failure detection circuit 610 to detect failure of the bridge circuit 210 may be the same or different between both bridge circuits, that is, the first bridge circuit 211 and the second bridge circuit 212.

As described above, the electric motor driving apparatus 2 having the failure detection circuit according to the second embodiment has: the plurality of bridge circuits which drive the multiplex-winding electric motor; the DC power supply; the PWM control circuit; the PWM signal generation circuit; the plurality of DC current detection circuits; the phase current calculation circuit; and the failure detection circuit, and the failure detection circuit determines failure of each DC current detection circuit from the DC current detected values in a zero voltage vector period in which the high-potential-side arms of the corresponding bridge circuit are all ON and in a zero voltage vector period in which the low-potential-side arms of the corresponding bridge circuit are all ON. Therefore, the electric motor driving apparatus 2 having the failure detection circuit can detect failure of the DC current detection circuit that includes a current sensor even during normal operation, regardless of the rotation rate of the multiplex-winding electric motor.

Further, the electric motor driving apparatus having the failure detection circuit according to the second embodiment can also detect short-circuit failure of the upper arms and the lower arms of the plurality of bridge circuits which drive the multiplex-winding electric motor, together with failure of the DC current detection circuit.

It is noted that in the present invention relating to an electric motor driving apparatus having a failure detection circuit and a failure detection method for the electric motor driving apparatus having a failure detection circuit, each embodiment may be modified or abbreviated as appropriate within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. An electric motor driving apparatus having a failure detection circuit, the electric motor driving apparatus comprising:
   a bridge circuit which drives an electric motor and is composed of high-potential-side arms and low-potential-side arms;
   a PWM control circuit which generates a voltage instruction for driving the electric motor;
   a PWM signal generation circuit which generates a PWM signal from the voltage instruction;
   a DC current detection circuit which detects DC current on a DC side of the bridge circuit;
   a phase current calculation circuit which calculates output phase current of the bridge circuit, based on the DC current and the PWM signal; and
   a failure detection circuit which detects failure of the DC current detection circuit, wherein the failure detection circuit determines failure of the DC current detection circuit from the DC current detected values in a zero voltage vector period in which the high-potential-side arms of the bridge circuit are all ON and in a zero voltage vector period in which the low-potential-side arms of the bridge circuit are all ON.

2. The electric motor driving apparatus having the failure detection circuit, according to claim 1, wherein
the failure detection circuit further determines short-circuit failure of the high-potential-side arms and the low-potential-side arms of the bridge circuit from the DC current detected values in the zero voltage vector period in which the high-potential-side arms of the bridge circuit are all ON and in the zero voltage vector period in which the low-potential-side arms of the bridge circuit are all ON.

3. The electric motor driving apparatus having the failure detection circuit according to claim 1, wherein the bridge circuit drives a three-phase winding electric motor and wherein the zero-voltage vector period comprises all of the high-potential side arms of the bridge circuit being ON or all of the low-potential-side arms of the bridge circuit being ON.

4. The electric motor driving apparatus having the failure detection circuit according to claim 3, wherein the failure detection circuit determines: a first value which comprises a zero or a one depending on whether the current detected by the DC current detection circuit is zero in the zero voltage vector period in which all of the high-potential-side arms of the bridge circuit are ON, and a second value which comprises a zero or a one depending on whether the current detected by the DC current detection circuit is zero in the zero voltage vector period in which all of the low-potential-side arms of the bridge circuit are ON, and
wherein the failure detection circuit determines said failure of the DC current detection circuit when the first value and the second value are equal to said one.

5. The electric motor driving apparatus having the failure detection circuit according to claim 3, wherein the failure detection circuit determines: a first value which comprises a zero or a one depending on whether the current detected by the DC current detection circuit is zero in the zero voltage vector period in which all of the high-potential-side arms of the bridge circuit are ON, and a second value which comprises a zero or a one depending on whether the current detected by the DC current detection circuit is zero in the zero voltage vector period in which all of the low-potential-side arms of the bridge circuit are ON, and wherein the failure detection circuit further determines a short-circuit failure of the high-potential-side arms when the first value is zero and the second value is one.

6. The electric motor driving apparatus having the failure detection circuit according to claim 3, wherein the failure detection circuit determines: a first value which comprises a zero or a one depending on whether the current detected by the DC current detection circuit is zero in the zero voltage vector period in which all of the high-potential-side arms of the bridge circuit are ON, and a second value which comprises a zero or a one depending on whether the current detected by the DC current detection circuit is zero in the zero voltage vector period in which all of the low-potential-side arms of the bridge circuit are ON, and
wherein the failure detection circuit further determines a short-circuit failure of the low-potential-side arms when the first value is one and the second value is zero.

7. The electric motor driving apparatus having the failure detection circuit according to claim 3, wherein the failure detection circuit determines: a first value which comprises a zero or a one depending on whether the current detected by the DC current detection circuit is zero in the zero voltage vector period in which all of the high-potential-side arms of the bridge circuit are ON, and a second value which comprises a zero or a one depending on whether the current detected by the DC current detection circuit is zero in the zero voltage vector period in which all of the low-potential-side arms of the bridge circuit are ON, and
wherein the failure detection circuit further determines that the high-potential side arms, the low-potential-side arms, and the DC current detection circuit operation is normal when the first value and the second value is zero.

8. The electric motor driving apparatus having the failure detection circuit, according to claim 1, further comprising at least one additional DC current detection circuit, wherein the electric motor is a multiplex-winding electric motor and the failure detection circuit detects a failure in each of the DC current detection circuit and said at least one additional DC current detection circuit.

9. An electric motor driving apparatus having a failure detection circuit, the electric motor driving apparatus comprising:
a plurality of bridge circuits which drive a multiplex-winding electric motor and are each composed of high-potential-side arms and low-potential-side arms;
a PWM control circuit which generates a voltage instruction for driving the multiplex-winding electric motor;
a PWM signal generation circuit which generates a PWM signal from the voltage instruction;
a plurality of DC current detection circuits which detect DC currents on DC sides of the plurality of bridge circuits;
a phase current calculation circuit which calculates output phase currents of the plurality of bridge circuits, based on the DC currents and the PWM signal; and
a failure detection circuit which detects failure of the plurality of DC current detection circuits, wherein
the failure detection circuit determines failure of the plurality of DC current detection circuits from the DC current detected values in a zero voltage vector period in which the high-potential-side arms of the corresponding bridge circuit are all ON and in a zero voltage vector period in which the low-potential-side arms of the corresponding bridge circuit are all ON.

10. The electric motor driving apparatus having the failure detection circuit, according to claim 9, wherein the failure detection circuit further determines short-circuit failure of the high-potential-side arms and the low-potential-side arms of the plurality of bridge circuits from the DC current detected values in the zero voltage vector period in which the high-potential-side arms of the bridge circuit are all ON and in the zero voltage vector period in which the low-potential-side arms of the bridge circuit are all ON.

11. The electric motor driving apparatus having the failure detection circuit, according to claim 9, wherein timing for the failure detection circuit to determine failure of each DC current detection circuit from the DC current detected values in the zero voltage vector period in which the high-potential-side arms of the corresponding bridge circuit are all ON and in the zero voltage vector period in which the low-potential-side arms of the corresponding bridge circuit are all ON, is different among the plurality of DC current detection circuits.

12. The electric motor driving apparatus having the failure detection circuit, according to claim 9, wherein timing for the failure detection circuit to determine failure of each DC current detection circuit from the DC current detected values in the zero voltage vector period in which the high-potentialside arms of the corresponding bridge circuit are all ON and in the zero voltage vector period in which the low-potential-side arms of the corresponding bridge circuit are all ON, is the same among the plurality of DC current detection circuits.

13. A failure detection method for an electric motor driving apparatus having a failure detection circuit, the electric motor driving apparatus including: a bridge circuit which drives an electric motor and is composed of high-potential-side arms and low-potential-side arms; a PWM control circuit which generates a voltage instruction for driving the electric motor; a PWM signal generation circuit which generates a PWM signal from the voltage instruction; a DC current detection circuit which detects DC current idc on a DC side of the bridge circuit; a phase current calculation circuit which calculates output phase current of the bridge circuit, based on the DC current idc and the PWM signal; and a failure detection circuit which detects failure of the DC current detection circuit, the failure detection method comprising:

processing of obtaining the DC current idc in a zero voltage vector period in which the high-potential-side arms are all ON;

processing of obtaining the DC current idc in a zero voltage vector period in which the low-potential-side arms are all ON; and processing of determining that the DC current detection circuit has failed, if idc≠0 is satisfied in the zero voltage vector period in which the high-potential-side arms are all ON and idc≠0 is satisfied in the zero voltage vector period in which the low-potential-side arms are all ON.

14. The failure detection method for the electric motor driving apparatus having a failure detection circuit, according to claim 13, the failure detection method further comprising:

processing of determining that the high-potential-side arm has failed due to short-circuit, if idc=0 is satisfied in the zero voltage vector period in which the high-potential-side arms are all ON and idc≠0 is satisfied in the zero voltage vector period in which the low-potential-side arms are all ON; and processing of determining that the low-potential-side arm has failed due to short-circuit, if idc≠0 is satisfied in the zero voltage vector period in which the high-potential-side arms are all ON and idc=0 is satisfied in the zero voltage vector period in which the low-potential-side arms are all ON.

15. A failure detection method for an electric motor driving apparatus having a failure detection circuit, comprising:

obtaining, by the failure detection circuit, a first value representing direct current (DC) from a DC current detection circuit, which detects DC current on a DC side of a bridge circuit that drives the electric motor, wherein the first value is obtained in a zero voltage vector period in which high-potential-side arms of the bridge circuit are ON;

obtaining, by the failure detection circuit, a second value representing the direct current (DC) from the DC current detection circuit, wherein the second value is obtained in a zero voltage vector period in which low-potential-side arms of the bridge circuit are ON; and determining failure of the DC current detection circuit based on both, the first value and the second value.

16. The failure detection method of claim 15, further comprising:

detecting failure of the DC current detection circuit when both the first value and the second value represent presence of the current in the DC current detection circuit.

17. The failure detection method of claim 15, further comprising:

detecting a failure of at least one of the high-potential side arms when the first value represents that no current is detected by the DC current detection circuit and the second value represents that the current is detected by the DC current detection circuit; and detecting a failure of at least one of the low-potential side arms when the first value represents that the current is detected by the DC current detection circuit and the second value represents that no current is detected by the DC current detection circuit.

\* \* \* \* \*